United States Patent Office 3,631,228
Patented Dec. 28, 1971

3,631,228
PREPARATION OF BENZENE ACETATES
Mahmoud S. Kablaoui, Wappingers Falls, N.Y., assignor to Texaco Inc., New York, N.Y.
No Drawing. Filed Feb. 27, 1970, Ser. No. 15,296
Int. Cl. C07c 69/14, 69/16
U.S. Cl. 260—479 R                  2 Claims

ABSTRACT OF THE DISCLOSURE

A method of preparing benzene acetates and diacetates of the formula:

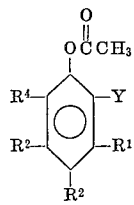

where $R^1$, $R^2$ and $R^3$ are hydrogen or alkyl of from 1 to 20 carbons, $R^4$ is alkyl of from 1 to 20 carbons and Y is hydrogen or an acetoxy radical comprising contacting a cyclohexanone of the formula:

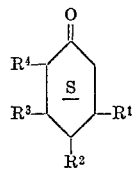

where $R^1$, $R^2$, $R^3$ and $R^4$ are as heretofore defined with a mixture of concentrated sulfuric acid and acetic anhydride.

BACKGROUND OF INVENTION

This invention relates to the preparation of alkylated benzene acetate and benzene diacetate products from alkylated cyclohexanones. The alkylated benzene acetate and diacetate products contemplated herein are readily converted by established hydrolysis techniques into the corresponding phenols and alkylated dihydroxybenzenes, the former being useful in plastic manufacture and the latter as dispersants for drilling muds.

In the past, the preparation of hydroxybenzenes often proved unsatisfactory. For example, 3-methylcatechol required starting with o-cresol, chlorinating, followed by separation of the ortho isomer, fusing the chlorinated product with base in the presence of a metal compound such as $PdCl_2$, $Ba(OH)_2$ and $CuCl_2$. The latter is converted to a metal oxide and had to be regenerated for reuse.

DESCRIPTION OF THE INVENTION

I have discovered and this constitutes my invention a method of converting alkylated cyclohexanones in high yields into corresponding alkylated benzene mono- and diacetates. The aforementioned undesirable features such as halogenation, fusion, regeneration and the like are not present in the subject process and, further, it is highly selective, inexpensive and relatively high yields are accompanied by ease of isolation of the monoacetate and diacetate product. Further, with negligible loss the monoacetate and diacetate can be easily converted to the corresponding phenols and dihydroxybenzenes by standard hydrolysis techniques.

Specifically, the alkylated benzene acetates of the formula:

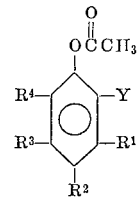

where $R^1$, $R^2$ and $R^3$ are hydrogen or alkyl of from 1 to 20 carbons, $R^4$ is alkyl of from 1 to 20 carbons and Y is hydrogen or an acetoxy radical, are prepared by contacting an alkylated cyclohexanone of the formula:

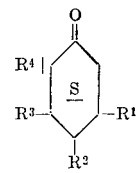

where $R^1$, $R^2$, $R^3$ and $R^4$ are as heretofore defined with a mixture of concentrated sulfuric acid and acetic anhydride utilizing a mole ratio of said sulfuric acid to said cyclohexanone of between about 0.05:1 and 5:1, preferably between about 1:1 and 2:1, and said acetic anhydride to said cyclohexanone between about 1:1 and 5:1 or more, preferably between about 1:1 and 2:1. It is to be noted acetic anhydride substantially in excess of the aforementioned range may be employed, the excess acetic anhydride functioning as diluent. The contacting is conducted at a temperature between about 30 and 150° C., preferably between 80 and 120° C., the reaction is normally conducted for a period of time between about 0.2 and 12 hours, preferably between 0.25 and 0.5 hour. Further, under preferred conditions, it is conducted under agitation in an inert atmosphere such as nitrogen.

If necessary to facilitate reactant contacting liquid diluent may be employed, e.g., between 2 and 50 wt. percent of reaction mixture. Examples of such diluent are excess acetic anhydride and inert solvent diluents such as xylene, toluene, benzene, heptane, hexane, chloroform, carbon tetrachloride, chlorobenzene and cyclohexane.

The alkylated benzene acetate and diacetate products can be recovered from the resultant mixture as heretofore stated by established techniques. One such technique of recovery comprises removing excess acetic anhydride and inert solvent-diluent (if employed) via fractional distillation, quenching the residue in water where the water content in the resultant mixture is between about 2 and 50 wt. percent, extracting the aqueous mixture with a water immiscible volatilizable solvent for the mono- and diacetate, washing the solvent layer with an alkali base, e.g., between 1 and 7 wt. percent aq. sodium bicarbonate, subjecting the washed solvent solution to distillation to remove the volatilizable extraction solvent leaving the purified alkylated benzene mono- and diacetate products as residue. The mono- and diacetate products may be further isolated from one another by further fractional distillation, crystallization and combinations thereof.

The conversion of the alkylated benzene mono- and diacetate product to the corresponding phenolic and dihydroxybenzene derivatives can be accomplished by hydrolyzing said benzene monoacetate and diacetates through contacting the acetate materials with aqueous mineral acid (e.g. 0.1 to 1 wt. percent aq. HCl) utilizing an acetate to aqueous mineral acid weight ratio of between about 1:2 and 1:100 at a temperature between about 30 and 100° C., most preferably under reflux conditions and extracting the formed hydroxybenzene from the aqueous acid solution with a water immiscible, volatilizable solvent for said phenols and dihydroxybenzene such as ether, benzene and chloroform. Following said extraction, the phenol and/or dihydroxybenzene products are separated from the solvent in the manner heretofore discussed in respect to the acetate and diacetate recovery and purification.

By the term "concentrated sulfuric acid" hereinbefore and hereinafter recited, an acid composition consisting of between 95 and 100 wt. percent $H_2SO_4$ and 0 to 5 wt. percent $H_2O$ is intended.

In the method of the invention the mole ratio of cyclohexanone reactant to sulfuric acid essentially determines the ratio of benzene monoacetate to benzene diacetate product. A mole ratio of ketone to acid less than about 1:2 produces the monoacetate product to the essential exclusion of diacetate and some unaromatized material, i.e., an enol acetate. A mole ratio of about 1:2 produces a diacetate product which is about 30% of the total mixture. Further increase of the mole ratio over 1:2 results in increase of the diacetate to monoacetate ratio, thus at 1:3 the diacetate is 50%.

One of the material features of the method of the invention is the employment of the concentrated sulfuric acid-acetic acid-anhydric combination. If other mineral acids such as concentrated hydrochloric acid and concentrated phosphoric acid are substituted for the sulfuric acid, no aromatization and benzene acetate formation takes place. The same is true if acetic anhydride is substituted with closely related acetic acid.

Further, important aspects are demonstrated in the quantities of cyclohexanone reactant, sulfuric acid and acetic anhydride components employed. Specifically, when sulfuric acid is substantially less than the minimum heretofore set forth aromatization does not occur and the product is normally an acetoxycyclohexene rather than the desired benzene acetates and/or diacetate products. Further, when the mole ratio of ketone to acid is less than 1:2, no diacetate is formed. When the solvent ($Ac_2O$) is diluted with acetic acid in a mole ratio of acetic acid to acetic anhydride of about 1:10 and 10:1 and higher, no diacetate is formed, instead only monoacetate is isolated.

Examples of the alkylated cyclohexanone reactants contemplated herein are 2-methylcyclohexanone, 2-ethylcyclohexanone, 2-decylcyclohexanone, and 2,3,4,5-tetrapropylcyclohexanone. Corresponding benzene monoacetates are 2-methylbenzene monoacetate, 2-ethylbenzene monoacetate, 2-decylbenzene monoacetate, 2,3-diethylbenzene acetate and 2,3,4,5-tetrapropylbenzene monoacetate. Corresponding benzene diacetates are 3-methylcatechol diacetate, 3-ethylcatechol diacetate, 3-decylcatechol diacetate, 3-4-diethylbenzene diacetate and 3,4,5,6-tetrapropylbenzene diacetate. In respect to the corresponding phenols and dihydroxybenzene products there are produced 2-methylphenol and/or 3-methylcatechol; 2-ethylphenol and/or 3-ethylcatechol; 2,3-diethylphenol and/or 3,4-diethylcatechol; 2,3,4,5-tetrapropylphenol and/or 3,4,5,6-tetrapropylcatechol.

The following example further illustrates the invention but is not to be construed as a limitation thereof.

EXAMPLE I

This example illustrates the method of the invention.

Into a 500 mls., 3-necked flask equipped with a magnetic stirrer, distilling head, sparger and a thermometer, there were charged 2-methylcyclohexanone and acetic anhydride. The mixture was cooled to 10–15° C. and concentrated sulfuric acid was added slowly to maintain the temperature range. After the addition was complete, nitrogen at the rate of 144 mls./minute was bubbled through the reaction mixture and the reaction mixture was refluxed (140° C.) while excess acetic anhydride was distilling. The rest of the acetic anhydride was distilled under vacuum and the residue was quenched in an equal volume of ice-water and stirred for 0.5 hour to decompose excess acetic anhydride. The residue was then extracted with 4–50 mls. of ether, ether layers combined, washed with 2–50 mls. portions of saturated aqueous sodium bicarbonate, once with saturated aqueous sodium chloride, dried and the ether stripped to give a 2-methylbenzene acetate and a 3-methylcatechol diacetate residue mixture. The gas chromatographic analysis of the residue and run data are reported below in Table I:

TABLE I

| Run | A | B | C |
|---|---|---|---|
| Ingredients, mole: | | | |
| 2-methylcyclohexanone | 0.44 | 0.44 | 0.44 |
| Sulfuric acid | 0.102 | 0.153 | 0.102 |
| Acetic anhydride (mls.) | 75 | 75 | 50 |
| Acetic acid (mls.) | | | 50 |
| Reaction conditions: | | | |
| Temperature, ° C | 140 | 140 | 118 |
| Time, hrs | ½ | ½ | 1 |
| Total aromatic acetate yield, wt. percent | 80 | 50 | 80 |
| Selectivity, percent: | | | |
| 2-methylbenzene acetate | 70 | 50 | 100 |
| 3-methylcatechol diacetate | 30 | 50 | 0 |

I claim:
1. A method of preparing an acetate product of the formula:

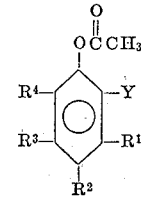

where $R^1$, $R^2$ and $R^3$ are hydrogen or alkyl of from 1 to 20 carbons, $R^4$ is alkyl of from 1 to 20 carbons and Y is hydrogen or an acetoxy radical comprising contacting a cyclohexanone of the formula:

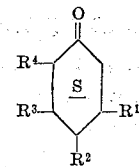

where $R^1$, $R^2$, $R^3$ and $R^4$ are as heretofore defined with a mixture of concentrated sulfuric acid and acetic anhydride utilizing a mole ratio of said sulfuric acid to said alkylated cyclohexanone of between about 0.05:1 and 5:1 and a mole ratio of said acetic anhydride to said alkylated cyclohexanone of between 1:1 and 5:1 at a temperature between about 30 and 150° C.

2. A method in accordance with claim 1 wherein said cyclohexanone is 2-methylcyclohexanone and said acetate product is a mixture of 3-methylcatechol diacetate and 2-methylbenzene acetate and the mole ratio of said sulfuric acid to said cyclohexanone is between about 2:1 and 3:1.

References Cited

Doering et al., J. Am. Chem. Soc., pp. 2221–6 (1949).

JAMES A. PATTEN, Primary Examiner

U.S. Cl. X.R.

260—624 R, 625